| (12) | United States Patent<br>Yoshida et al. | (10) Patent No.: US 12,358,078 B2<br>(45) Date of Patent: Jul. 15, 2025 |
|---|---|---|

(54) LASER MACHINING DEVICE

(71) Applicant: MITSUBISHI HEAVY INDUSTRIES, LTD., Tokyo (JP)

(72) Inventors: Kazuhiro Yoshida, Tokyo (JP); Yoshinao Komatsu, Tokyo (JP); Saneyuki Goya, Tokyo (JP); Akiko Inoue, Tokyo (JP); Yasuyuki Fujiya, Tokyo (JP); Ryuichi Narita, Tokyo (JP); Masahiko Shimizu, Tokyo (JP); Ryota Ozaki, Tokyo (JP); Yuki Kani, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 640 days.

(21) Appl. No.: 17/437,941

(22) PCT Filed: Jun. 28, 2019

(86) PCT No.: PCT/JP2019/025837
§ 371 (c)(1),
(2) Date: Sep. 10, 2021

(87) PCT Pub. No.: WO2020/261537
PCT Pub. Date: Dec. 30, 2020

(65) Prior Publication Data
US 2022/0168848 A1 Jun. 2, 2022

(51) Int. Cl.
*B23K 26/364* (2014.01)
*B23K 26/082* (2014.01)
(Continued)

(52) U.S. Cl.
CPC .......... *B23K 26/364* (2015.10); *B23K 26/142* (2015.10); *B23K 26/1476* (2013.01); *B23K 26/082* (2015.10)

(58) Field of Classification Search
CPC .............. B23K 26/1476; B23K 26/364; B23K 26/142; B23K 2103/16; B23K 2103/42
See application file for complete search history.

(56) References Cited

U.S. PATENT DOCUMENTS 5,500,505 A * 3/1996 Jones ...................... B23K 26/40
219/121.72
5,609,781 A * 3/1997 Kaga .................. B23K 26/1437
219/121.84

(Continued)

FOREIGN PATENT DOCUMENTS

| JP | 2000202672 A | 7/2000 |
|---|---|---|
| JP | 2006068773 A | 3/2006 |
| JP | 2011036865 A | 2/2011 |

OTHER PUBLICATIONS

International Search Report and Written Opinion of International Application No. PCT/JP2019/025837 mailed Jul. 23, 2019; 11pp.

*Primary Examiner* — Thien S Tran
(74) *Attorney, Agent, or Firm* — HAUPTMAN HAM, LLP

(57) ABSTRACT

A laser machining device includes: a laser irradiation unit that forms a machining groove that has one end opening to an end section of a workpiece and the other end thereof closed, as a result of scanning a workpiece surface from an end section of the workpiece and laser machining the workpiece; and a nozzle unit that sprays a gas across an irradiation zone of the workpiece surface created by the laser irradiation unit. The nozzle unit is configured so as to increase the flowrate of the gas supplied to the irradiation zone, from one end to the other end of the machining groove.

8 Claims, 5 Drawing Sheets

(51) Int. Cl.
*B23K 26/14* (2014.01)
*B23K 26/142* (2014.01)

(56) References Cited

U.S. PATENT DOCUMENTS

| | | | | |
|---|---|---|---|---|
| 5,767,479 | A * | 6/1998 | Kanaoka | B23K 26/60 |
| | | | | 219/121.72 |
| 6,294,754 | B1 | 9/2001 | Nagura et al. | |
| 2008/0041832 | A1* | 2/2008 | Sykes | B23K 26/127 |
| | | | | 219/121.84 |
| 2013/0146674 | A1* | 6/2013 | Miller | B05B 13/00 |
| | | | | 239/548 |
| 2015/0352667 | A1* | 12/2015 | Hemes | B23K 26/144 |
| | | | | 219/121.61 |
| 2019/0100080 | A1* | 4/2019 | Lattin | B60H 1/00378 |

* cited by examiner

LASER MACHINING DEVICE

RELATED APPLICATIONS

The present application is a National Phase of International Application Number PCT/JP2019/025837 filed Jun. 28, 2019.

TECHNICAL FIELD

The present invention relates to a laser machining device.

BACKGROUND ART

As an example, a device using irradiation of a laser beam is used in machining for performing material cutting (for example, refer to PTL 1 below). A laser machining device configured in this way has a light source and a galvanometer mirror that reflects a laser generated by the light source. An irradiation range of the laser beam can be moved by changing a posture of the galvanometer mirror. That is, thermal energy of the laser beam can be transmitted to a workpiece by moving the laser on (scanning) a surface of the workpiece, and cutting machining can be performed on the workpiece.

In addition, in a case where the workpiece is formed of carbon fiber reinforced plastic (CFRP), when laser machining is performed as described above, it is known that a plume is generated. When the plume is generated, a cutting surface (machining groove) of the workpiece is degenerated due to an exposure to a high temperature of the plume. A resin component is dropped out or carbonized, thereby forming a heat-affected layer. When the CFRP is applied to a product, the heat-affected layer is removed in general.

CITATION LIST

Patent Literature

[PTL 1] Japanese Unexamined Patent Application Publication No. 2011-36865

SUMMARY OF INVENTION

Technical Problem

However, a laser machining device in the related art have the following problems. Due to the generated plume, accuracy in machining the product is degraded, or the number of man-hours for removing the heat-affected layer from the workpiece is increased.

The present invention is made to solve the above-described problems, and an object thereof is to provide a laser machining device capable of further preventing formation of a heat-affected layer.

Solution to Problem

According to an aspect of the present invention, there is provided a laser machining device including a laser irradiation unit that forms a machining groove of which one end is open to an end portion of a workpiece and the other end is closed, by performing laser machining on the workpiece while scanning a workpiece surface from the end portion of the workpiece, and a nozzle unit that ejects a gas over an irradiation range of the workpiece surface on which the laser machining is performed by the laser irradiation unit. The nozzle unit is configured so that a flow speed of the gas supplied to the irradiation range increases from one end toward the other end of the machining groove.

According to the above-described configuration, in the gas supplied by the nozzle unit, a flow speed of the gas increases toward the other end side of the machining groove. Furthermore, the other end of the machining groove is closed. In this manner, inside the machining groove, a pressure of the gas becomes higher on the other end side than that on one end side. As a result, inside the machining groove, the gas flows from the other end side toward the one end side. Due to the flow of the gas, a plume generated by the laser machining can be pushed outward from the one end side of the machining groove. That is, it is possible to reduce a possibility that a workpiece may be affected by high heat of the plume.

In the above-described laser machining device, the flow speed of the gas supplied to the irradiation range may be configured to increase from a portion where a relative distance between the nozzle unit and the workpiece surface in the irradiation range is short toward a portion where the relative distance is long.

According to the above-described configuration, the flow speed of the gas increases as the relative distance between the nozzle unit and the workpiece surface becomes longer in the irradiation range. Therefore, the gas can be stably supplied even at a position far from a nozzle in the irradiation range. As a result, the plume can be more positively removed from the machining groove. Furthermore, according to the above-described configuration, the nozzle unit does not need to directly face the irradiation range. In this manner, a degree of freedom in disposing the laser irradiation unit and the nozzle unit can be improved. On the other hand, when the laser irradiation unit and the nozzle unit are coaxially disposed, the nozzle unit needs to be configured to eject gas while a laser beam is transmitted. Accordingly, a structure is complicated, thereby causing a possibility of a cost increase. According to the above-described configuration, the possibility can be reduced.

In the above-described laser machining device, the nozzle unit may be configured to eject the gas to an extending direction of the machining groove from a direction inclined to the one end side of the machining groove, when viewed in a direction orthogonal to the machining groove in a plane on which the workpiece surface spreads.

According to the above-described configuration, the nozzle unit ejects the gas from the direction inclined to the irradiation range. Therefore, the nozzle unit does not need to directly face the irradiation range. In this manner, a degree of freedom in disposing the laser irradiation unit and the nozzle unit can be improved. On the other hand, when the laser irradiation unit and the nozzle unit are coaxially disposed, the nozzle unit needs to be configured to eject gas while a laser beam is transmitted. Accordingly, a structure is complicated, thereby causing a possibility of a cost increase. According to the above-described configuration, the possibility can be reduced.

In the above-described laser machining device, the nozzle unit may be configured to eject the gas from a position adjacent to the irradiation range in a direction orthogonal to an extending direction of the machining groove, when viewed in a direction orthogonal to the workpiece surface.

According to the above-described configuration, the nozzle unit ejects the gas from the position adjacent to the irradiation range. Therefore, the nozzle unit does not need to directly face the irradiation range. In this manner, a degree of freedom in disposing the laser irradiation unit and the nozzle unit can be improved. On the other hand, when the laser irradiation unit and the nozzle unit are coaxially disposed, the nozzle unit needs to be configured to eject gas while a laser beam is transmitted. Accordingly, a structure is complicated, thereby causing a possibility of a cost increase. According to the above-described configuration, the possibility can be reduced.

In the above-described laser machining device, the nozzle unit may be provided at a position overlapping the laser irradiation unit, when viewed in a direction orthogonal to the workpiece surface.

According to the above-described configuration, the gas supplied from the nozzle unit and the laser beam emitted for irradiation from the laser irradiation unit can be directed toward the workpiece from the same direction. As a result, the gas can be accurately supplied toward the irradiation range of the laser beam. In this manner, the plume generated inside the machining groove can be more efficiently removed.

In the above-described laser machining device, the laser irradiation unit may be provided at a position farther away from the workpiece surface than the nozzle unit, and the nozzle unit may have a transmission window portion through which the laser beam is transmittable.

According to the above-described configuration, the laser can be emitted for irradiation from a direction the same as that of the nozzle unit through the transmission window portion provided in the nozzle unit. As a result, the gas can be more accurately supplied toward the irradiation range of the laser beam.

In the above-described laser machining device, the nozzle unit may have a gas nozzle in which a plurality of opening portions are formed to be adjacent to each other from the one end portion to the other end, and an opening area of the plurality of opening portions may be configured to gradually decrease from the one end toward the other end.

According to the above-described configuration, the flow speed of the gas can be easily adjusted only by configuring the opening area of the plurality of opening portions to decrease from the one end toward the other end of the machining groove. In this manner, the plume can be more easily removed at a lower cost.

In the above-described laser machining device, the nozzle unit may have a plurality of resistors provided to be adjacent to each other from the one end portion toward the other end, and generating resistance against a flow of the gas, and the plurality of resistors may be configured so that the resistance gradually decreases from the one end toward the other end.

According to the above-described configuration, the flow speed of the gas can be easily adjusted only by configuring a magnitude of the resistance generated due to the plurality of resistors to decrease from the one end toward the other end of the machining groove. In this manner, the plume can be more easily removed at a lower cost.

In the above-described laser machining device, the resistor may be a porous plate in which a plurality of holes are formed, and may be configured so that an opening ratio of the porous plate gradually increases from the one end toward the other end.

According to the above-described configuration, the flow speed of the gas can be easily adjusted only by using the porous plate which is inexpensive, as the resistor. In this manner, the plume can be more easily removed at a lower cost.

In the above-described laser machining device, the resistor may be a valve whose opening degree is adjustable, and may be configured so that an opening degree of the valve increases from the one end toward the other end.

According to the above-described configuration, the flow speed of the gas can be easily adjusted by using the valve whose opening degree is adjustable, as the resistor. In this manner, the plume can be more easily removed at a lower cost. In addition, a distribution of the flow speed of the gas can be more precisely adjusted by changing the opening degree of the valve.

According to another aspect of the present invention, there is provided a laser machining device including a laser irradiation unit that forms a machining groove of which one end is open to an end portion of a workpiece and the other end is closed, by performing laser machining on the workpiece while scanning a workpiece surface from the end portion of the workpiece, and a nozzle unit that ejects a gas over an irradiation range of the workpiece surface on which the laser machining is performed by the laser irradiation unit. The nozzle unit may be configured so that a flow speed of the gas supplied to the irradiation range increases from the other end toward the one end of the machining groove.

According to the above-described configuration, in the gas supplied by the nozzle unit, the flow speed of the gas increases toward the one end side of the machining groove. In this manner, inside the machining groove, the pressure of the gas becomes higher on the one end side than that on the other end side. As a result, inside the machining groove, the gas flows from the one end side toward the other end side. Due to the flow of the gas, the plume generated by the laser machining can be pushed outward from the other end side of the machining groove. That is, it is possible to reduce a possibility that a workpiece may be affected by high heat of the plume.

Advantageous Effects of Invention

According to the present invention, it is possible to provide a laser machining device capable of further preventing formation of a heat-affected layer.

DESCRIPTION OF EMBODIMENTS

First Embodiment

Figure 1:
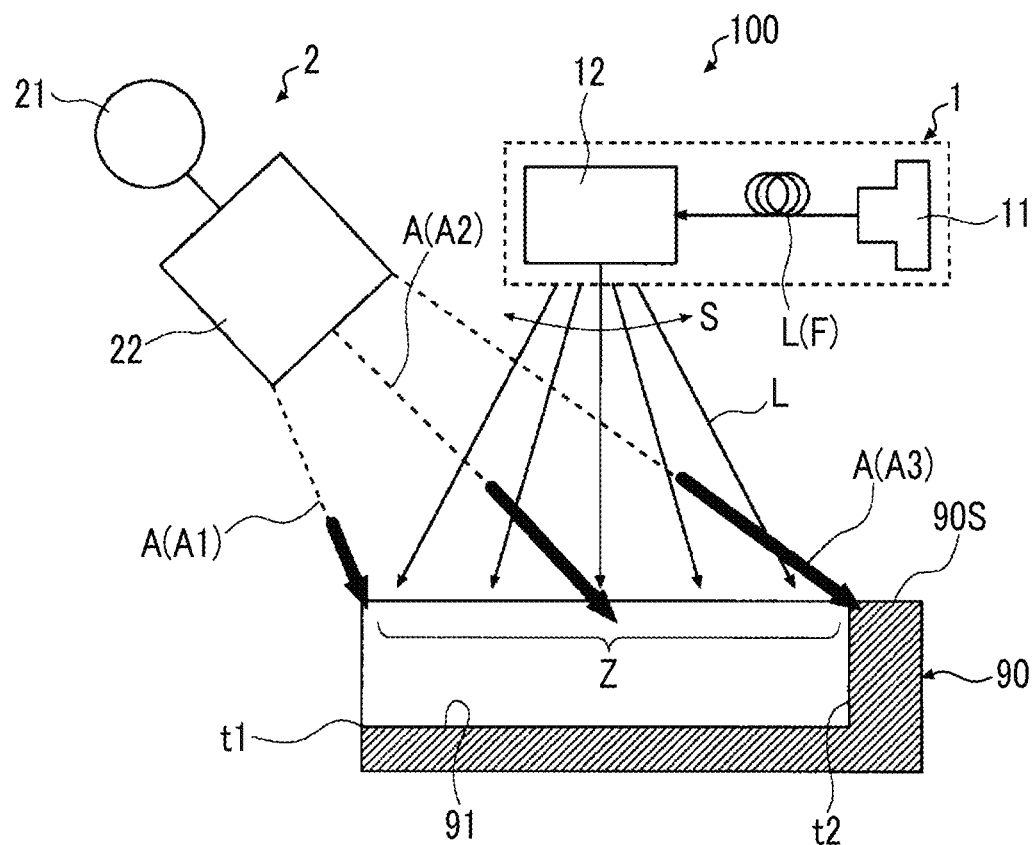
FIG. 1 is a side view illustrating a configuration of a laser machining device according to a first embodiment of the present invention.
Figure 2:
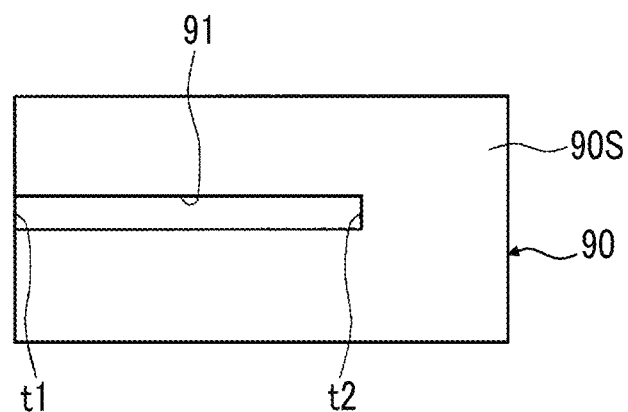
FIG. 2 is a plan view of a workpiece according to the first embodiment of the present invention.

A first embodiment of the present invention will be described with reference to FIGS. 1 to 3. A laser machining device 100 according to the present embodiment is a device for performing cutting machining or drilling machining by emitting a laser for irradiation toward a workpiece 90 formed of carbon fiber reinforced plastic (CFRP), resin, or metal with a laser, for example. As illustrated in FIG. 1, the laser machining device 100 includes a laser irradiation unit 1 and a nozzle unit 2.

The laser irradiation unit 1 emits a laser beam L for irradiation toward a surface (workpiece surface 90S) of the workpiece 90. The laser irradiation unit 1 includes a light source 11, an optical fiber F, and a Galvano scanner 12. As an example, the light source 11 generates a fiber laser beam or a YAG laser beam. A Galvano scanner 12 is disposed in a traveling direction of the laser beam L. Although not illustrated in detail, the Galvano scanner 12 internally has a galvanometer mirror. The galvanometer mirror reflects the laser beam L emitted for irradiation from the light source 11. The galvanometer mirror can change a posture, based on a command input from an external control device (not illustrated). In this manner, the galvanometer mirror scans the workpiece surface 90S with the laser beam L. A laser head including the Galvano scanner 12 is located above the workpiece surface 90S, and is disposed at a position farther than a distance from a gas nozzle 22 (to be described later) to the workpiece surface 90S. In addition, the gas nozzle 22 is disposed at a position that does not interfere with a passage through which the laser beam L passes from the laser head to the workpiece surface 90S.

In the present embodiment, as indicated by an arrow S in FIG. 1, the laser beam L reciprocates (performs scanning) linearly or curvedly on the workpiece surface 90S. In some cases, the laser beam L does not reciprocate, and is only emitted for irradiation from one side toward the other side. A range in which the laser beam L reciprocates for irradiation is defined as an irradiation range Z. Thermal energy of the laser beam L enables cutting machining (laser machining) to be performed on the workpiece 90 within the irradiation range Z. A machining groove 91 is formed in the workpiece 90 by performing the cutting machining. As illustrated in FIG. 1 or 2, in the machining groove 91, one end (end portion t1) is open to an end portion of the workpiece 90. The other end (end portion t2) and a bottom surface (groove bottom surface 91B illustrated in FIG. 4) are closed. That is, the cutting machining is progressively performed from the end portion t1 side serving as an end surface of the workpiece 90 toward the end portion t2 side serving as a groove portion.

The nozzle unit 2 is provided to eject a gas (air as an example) toward the above-described irradiation range Z. The nozzle unit 2 has a compressor 21 and a gas nozzle 22. The compressor 21 compresses externally fetched air to generate high-pressure air. The high-pressure air is supplied as a jet stream A to the irradiation range Z on the workpiece surface 90S through the gas nozzle 22. In addition to the air, nitrogen or a rare gas can be preferably used as the above-described gas.

In the present embodiment, the gas nozzle 22 is disposed obliquely upward with respect to the workpiece surface 90S. More specifically, the gas nozzle 22 is configured to eject the air in a direction including a component in a direction extending along the machining groove 91 and a component in a direction orthogonal to the workpiece surface 90S. Furthermore, in other words, the gas nozzle 22 is configured to eject the air to an extending direction of the machining groove 91 from a direction inclined to one end side (end portion t1 side) of the machining groove 91, when viewed in the direction orthogonal to the machining groove 91 in a plane where the workpiece surface 90S spreads.

Figure 3:
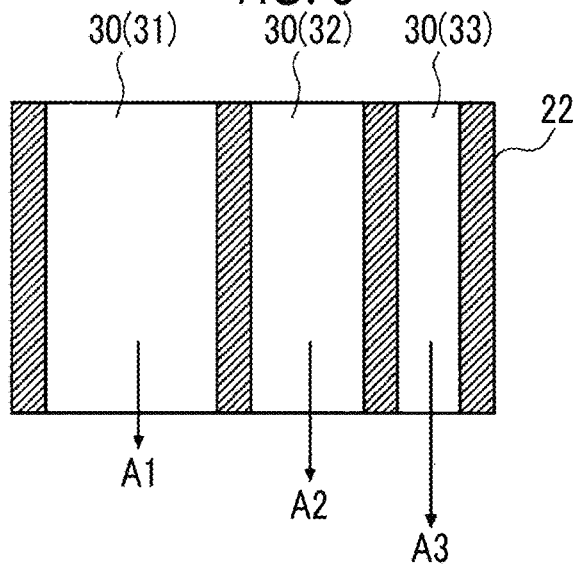
FIG. 3 is a cross-sectional view illustrating a configuration of a gas nozzle according to the first embodiment of the present invention.

As illustrated in FIG. 3, the gas nozzle 22 has a plurality of opening portions 30 serving as flow paths through which the high-pressure air flows. In an example of FIG. 3, three opening portions 30 (first opening portion 31, second opening portion 32, and third opening portion 33) are formed. The number of the opening portions 30 may be four or more. The first opening portion 31, the second opening portion 32, and the third opening portion 33 are arranged in the extending direction of the above-described machining groove 91 (direction from the end portion t1 toward the end portion t2). The first opening portion 31 has an opening area (flow path cross-sectional area) larger than that of the second opening portion 32. The second opening portion 32 has an opening area (flow path cross-sectional area) larger than that of the third opening portion 33. Therefore, a flow speed of the ejected air increases from the first opening portion 31 toward the third opening portion 33. A cross-sectional shape of the opening portion 30 can be appropriately set to any desired shape such as a rectangular shape, a polygonal shape, and a circular shape, depending on a design or specifications.

According to the above-described configuration, as illustrated in FIG. 1, the jet stream A (jet stream A3) supplied to the other end side (end portion t2 side) of the machining groove 91 has the flow speed higher than those of jet streams A1 and A2 on one end side (end portion t1 side) from the jet stream A3. In other words, the flow speed of the jet stream A increases from a portion where a relative distance to the nozzle unit 2 in the irradiation range Z is short to a portion where the relative distance is long. A length of each arrow indicating the jet stream A in FIG. 1 schematically indicates a magnitude of the flow speed of the jet stream A. That is, the longer arrow indicates the higher flow speed of the jet stream A.

Subsequently, an operation of the laser machining device 100 according to the present embodiment will be described. In operating the laser machining device 100, the laser beam L is supplied to the Galvano scanner 12 through the light source 11 and the optical fiber F which are described above. At the same time, the compressor 21 is driven to eject high-pressure air from the gas nozzle 22. The irradiation range Z on the workpiece surface 90S is irradiated with the laser beam L via the Galvano scanner 12. The irradiation range Z is irradiated with the laser beam L, thereby forming the machining groove 91 in the workpiece 90. Specifically, laser machining is performed from the end portion t1 side toward the end portion t2 side of the workpiece 90. A depth of the machining groove 91 is gradually increased by repeatedly performing scanning of the laser beam L.

Here, when the above-described laser machining is performed on the workpiece 90 formed of CFRP, a portion of the workpiece 90 is burnt or melted by thermal energy of the laser beam L, thereby generating the plume. When the plume is generated, a cutting surface (machining groove 91) of the workpiece may be degenerated due to an exposure to a high temperature of the plume, and a heat-affected layer may be formed on the cutting surface. When the laser machining is performed on the CFRP, a resin component is dropped out or carbonized, thereby forming the heat-affected layer. The heat-affected layer is not necessary in ensuring quality of a product. Therefore, it is desirable to provide a technique for preventing formation of the heat-affected layer.

Figure 4:
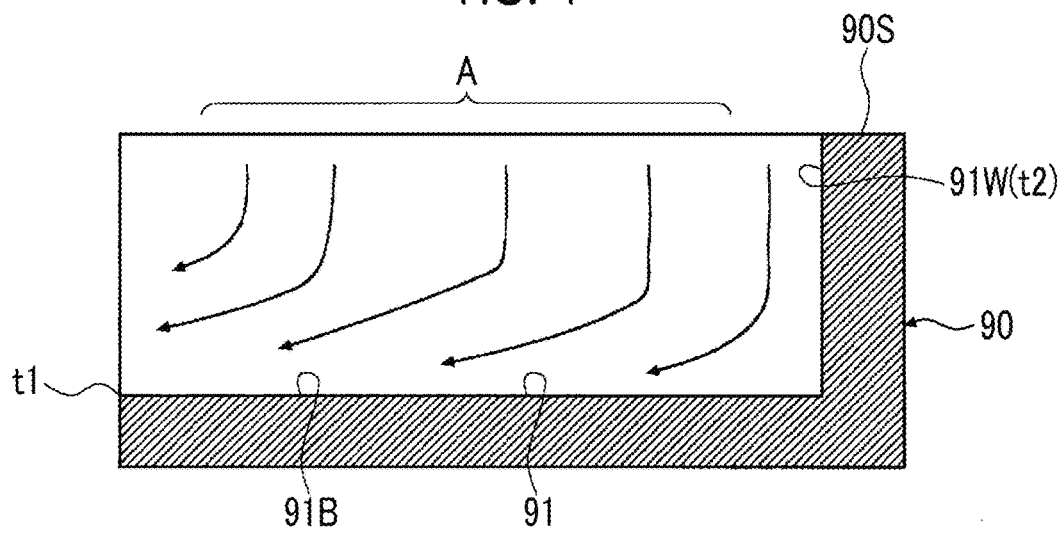
FIG. 4 is an enlarged cross-sectional view of the workpiece according to a first embodiment of the present invention, and is a view for describing a behavior of a gas flowing inside a machining groove.

Therefore, in the laser machining device 100 according to the present embodiment, the plume generated in the irradiation range Z is removed by the high-pressure air supplied from the above-described nozzle unit 2. As described above, a flow speed of the jet stream A supplied from the nozzle unit 2 increases from the end portion t1 side toward the end portion t2 side. In this manner, the pressure generated by the jet stream A inside the machining groove 91 increases toward the end portion t2 side. As a result, as illustrated in FIG. 4, a flow is formed from a high-pressure side to a low-pressure side. Specifically, the flow is made from the end portion t2 side to the end portion t1 side of the machining groove 91. Due to the flow, the plume generated inside the machining groove 91 is discharged from the end portion t1 side of the machining groove 91. Therefore, the heat-affected layer caused by the plume is prevented from being formed on an inner wall surface of the machining groove 91.

As described above, according to the above-described configuration, the flow speed of the gas supplied by the nozzle unit 2 increases toward the other end side (end portion t2 side) of the machining groove 91. Furthermore, the other end of the machining groove 91 is closed. In this manner, inside the machining groove 91, the pressure of the gas becomes higher on the other end side than that on one end side (end portion t1 side). As a result, inside the machining groove 91, the gas (jet stream A) flows from the other end side toward one end side. Due to the flow of the gas, the plume generated by the laser machining can be pushed outward from one end side of the machining groove 91. That is, it is possible to prevent the workpiece 90 from being affected by high heat of the plume (that is, the formation of the heat-affected layer).

Furthermore, according to the above-described configuration, the flow speed of the gas increases as the relative distance to the nozzle unit 2 is longer in the irradiation range Z. In addition, the nozzle unit 2 ejects the gas in a direction inclined with respect to the irradiation range Z. Therefore, the gas can be stably supplied to a position far away from the nozzle unit 2 in the irradiation range Z. As a result, the plume can be more positively removed from the machining groove 91. Furthermore, according to the above-described configuration, the nozzle unit 2 does not need to directly face the irradiation range Z. In this manner, a degree of freedom in disposing the laser irradiation unit 1 and the nozzle unit 2 can be improved. On the other hand, when the laser irradiation unit 1 and the nozzle unit 2 are coaxially disposed, the nozzle unit 2 needs to be configured to eject the gas while the laser is transmitted. Accordingly, a structure is complicated, thereby causing a possibility of a cost increase. According to the above-described configuration, the possibility can be reduced.

According to the above-described configuration, the flow speed of the gas can be easily adjusted only by configuring the opening area of the plurality of opening portions 30 to decrease from one end toward the other end of the machining groove 91. In this manner, the plume can be more easily removed at a lower cost.

Figure 5:
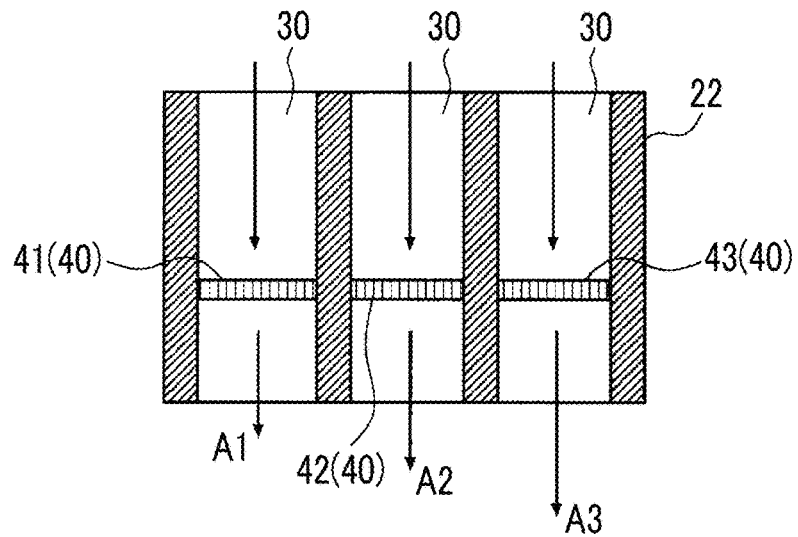
FIG. 5 is a cross-sectional view illustrating a modification example of the gas nozzle according to the first embodiment of the present invention.
Figure 6:
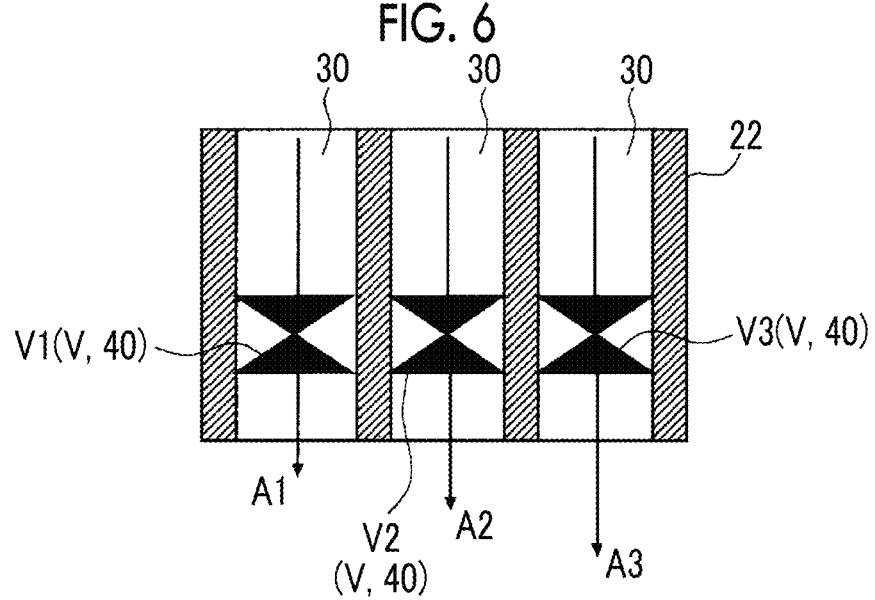
FIG. 6 is a cross-sectional view illustrating another modification example of the gas nozzle according to the first embodiment of the present invention.

Hitherto, the first embodiment of the present invention has been described. The above-described configurations can be changed or modified in various ways as long as the change or the modification does not depart from the concept of the present invention. For example, in the first embodiment, a configuration has been described as follows. The flow speed is changed between the plurality of opening portions 30 by changing the opening area of the opening portions 30 in the gas nozzle 22. However, the gas nozzle 22 can also be configured as illustrated in FIGS. 5 and 6. In an example of FIG. 5, the opening areas of the opening portions 30 are the same as each other, and each porous plate serving as a resistor 40 is provided inside each of the opening portions 30. The porous plate is a plate material in which a plurality of holes are formed. An opening ratio of the resistor 40 gradually increases from the end portion t1 side toward the end portion t2 side. In other words, the resistor 40 on the end portion t2 side has a larger number of holes. That is, the plurality of resistors 40 are configured so that the resistance against the flow of the gas gradually decreases from the end portion t1 side toward the end portion t2 side. Therefore, the jet stream A2 passing through a second resistor 42 has a higher flow speed than the jet stream A1 passing through a first resistor 41. Similarly, a jet stream A3 passing through a third resistor 43 has a higher flow speed than the jet stream A2 passing through the second resistor 42.

According to the above-described configuration, the flow speed of the gas can be easily adjusted only by using the porous plate which is inexpensive, as the resistor 40. In this manner, the plume can be more easily removed at a lower cost. As the resistor 40, a wire mesh can be used instead of the above-described porous plate. In this case, a magnitude of the resistance can be adjusted by changing a diameter and the number of wire rods forming the wire mesh.

In an example of FIG. 6, a valve V whose opening degree can be adjusted is used as the resistor 40. The opening degree of a third valve V3 on the end portion t2 side is higher than that of a second valve V2 adjacent thereto. The opening degree of a second valve V2 is higher than that of a first valve V1 on the end portion t1 side. That is, the opening degree of the valve V increases toward the end portion t2 side. In this manner, the valve V on the end portion t2 side has the lower resistance against the flow of the gas.

According to the above-described configuration, as the resistor 40, the flow speed of the gas can be easily adjusted by using the valve V whose opening degree can be adjusted. In this manner, the plume can be more easily removed at a lower cost. Furthermore, a distribution of the flow speed of the gas can be more precisely adjusted by changing the opening degree of the valve V.

Figure 7:
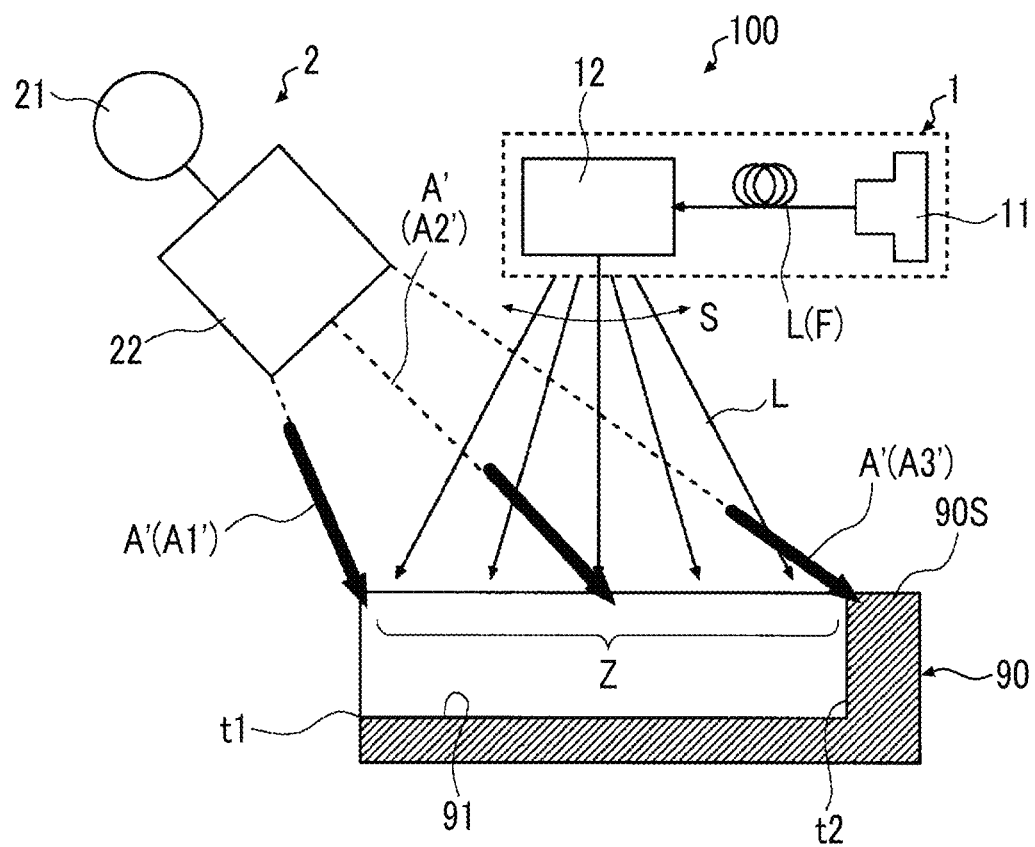
FIG. 7 is a side view illustrating a modification example of the laser machining device according to the first embodiment of the present invention.

Furthermore, in the first embodiment, a configuration has been described in which the flow speed of the jet stream A gradually increases from the end portion t1 side toward the end portion t2 side. However, as illustrated in FIG. 7, the gas nozzle 22 can be configured so that the flow speed of a jet stream A'(A1', A2', or A3') increases from the end portion t2 side toward the end portion t1 side. According to this configuration, an operational effect as the same as that of the first embodiment can also be obtained.

Second Embodiment

Figure 8:
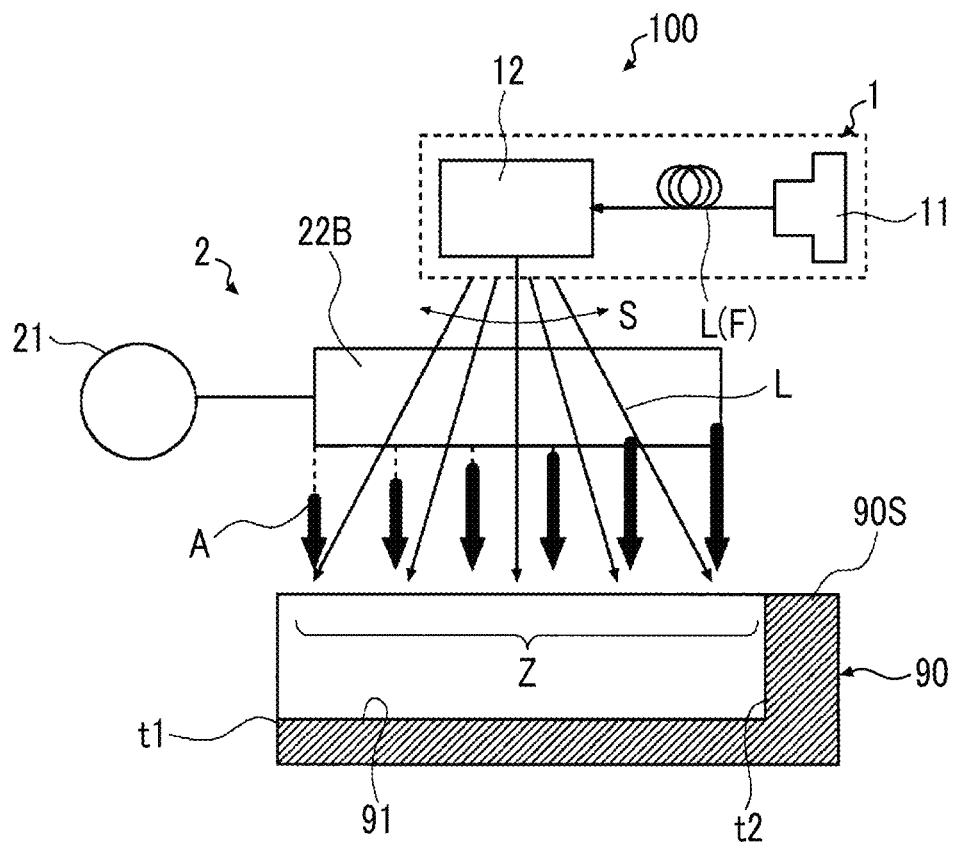
FIG. 8 is a side view illustrating a configuration of a laser machining device according to a second embodiment of the present invention.
Figure 9:
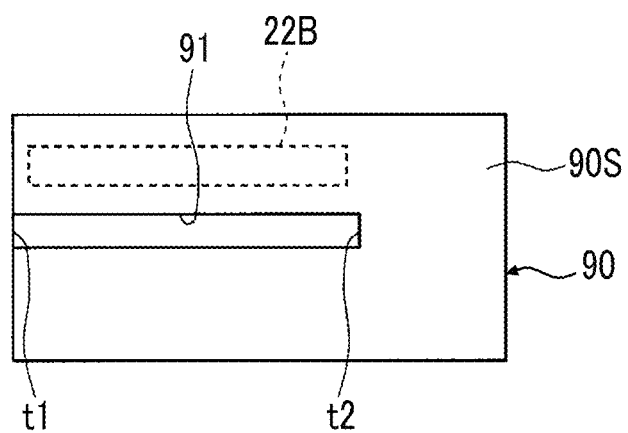
FIG. 9 is a plan view illustrating a configuration of the laser machining device according to the second embodiment of the present invention.

Next, a second embodiment of the present invention will be described with reference to FIGS. 8 and 9. The same reference numerals will be assigned to configurations the same as those in the first embodiment, and detailed description thereof will be omitted. As illustrated in FIGS. 8 and 9, in the present embodiment, relative positions of the gas nozzle 22B and the laser irradiation unit 1 are different from those in the first embodiment. The gas nozzle 22B is provided at a position adjacent to the irradiation range Z in a direction orthogonal to an extending direction of the machining groove 91, when viewed in a direction orthogonal to the workpiece surface 90S. That is, in a plan view, the gas nozzle 22B and the irradiation range Z do not overlap each other. The gas nozzle 22B supplies the jet stream A toward the workpiece surface 90S (irradiation range Z). The flow speed of the jet stream A is set to gradually increase from the end portion t1 side toward the end portion t2 side of the machining groove 91. In setting the flow speed of the jet stream A to be different, any one of the configurations described above in the first embodiment and the modification example can be applied.

According to the above-described configuration, the nozzle unit 2 (gas nozzle 22B) ejects the gas from a position adjacent to the irradiation range Z in a plan view. Therefore, the nozzle unit 2 does not need to directly face the irradiation range Z. In this manner, a degree of freedom in disposing the laser irradiation unit 1 and the nozzle unit 2 can be improved. On the other hand, when the laser irradiation unit 1 and the nozzle unit 2 are coaxially disposed, the nozzle unit 2 needs to be configured to eject the gas while the laser beam L is transmitted. Accordingly, a structure is complicated, thereby causing a possibility of a cost increase. According to the above-described configuration, the possibility can be reduced.

Hitherto, the second embodiment of the present invention has been described. The above-described configurations can be changed or modified in various ways as long as the change or the modification does not depart from the concept of the present invention.

Third Embodiment

Figure 10:
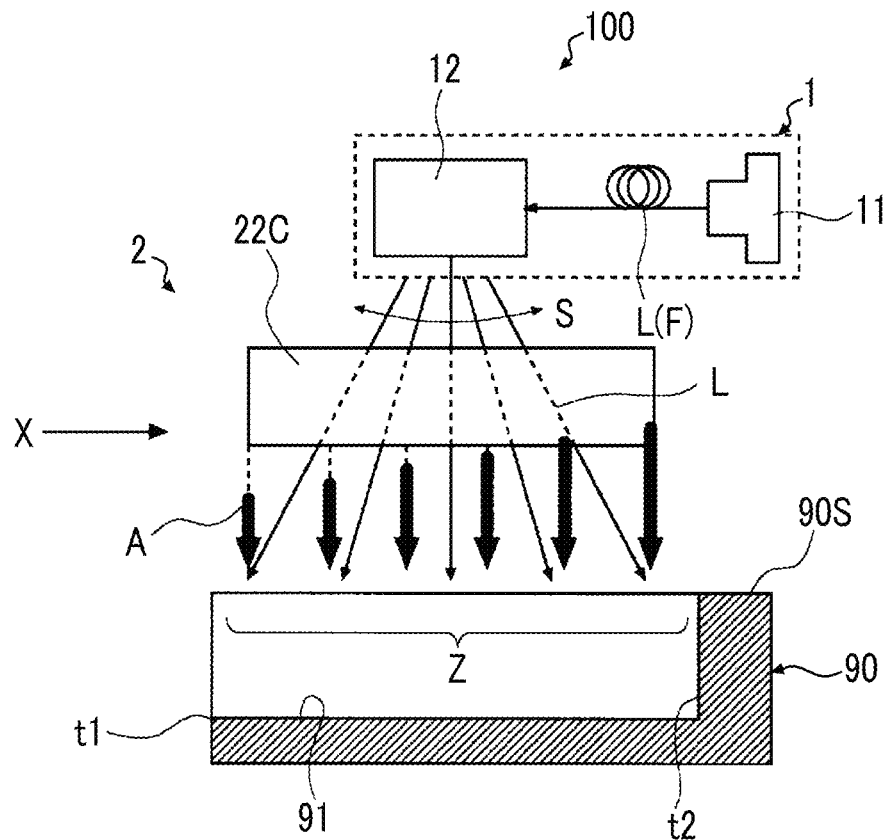
FIG. 10 is a side view illustrating a configuration of a laser machining device according to a third embodiment of the present invention.
Figure 11:
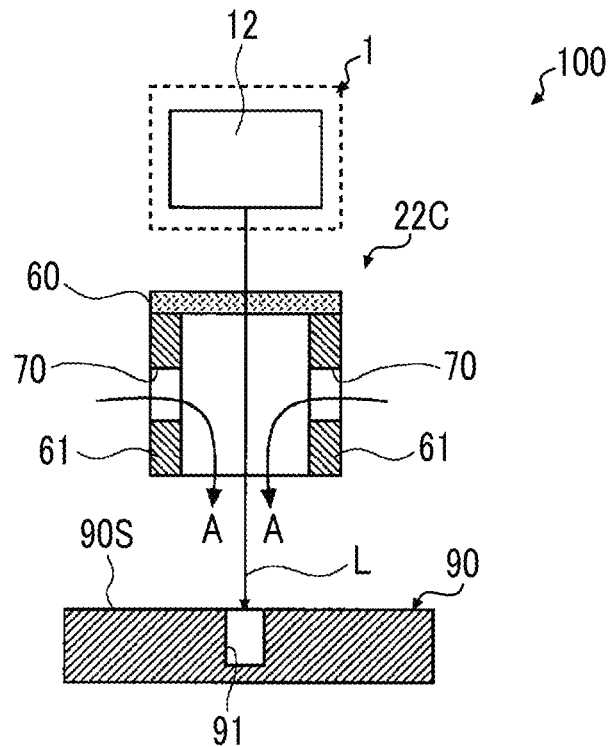
FIG. 11 is a cross-sectional view when a gas nozzle is viewed in an X-direction in FIG. 10.

Next, a third embodiment of the present invention will be described with reference to FIGS. 10 and 11. The same reference numerals will be assigned to configurations the same as those in each of the above-described embodiments, and detailed description thereof will be omitted. In FIGS. 10 and 11, illustration of the compressor 21 described in each of the above-described embodiments is omitted. As illustrated in FIGS. 10 and 11, in the present embodiment, a configuration of a gas nozzle 22C is different from that of each of the above-described embodiments. Specifically, the gas nozzle 22C is provided at a position overlapping the laser irradiation unit 1, when viewed in the direction orthogonal to the workpiece surface 90S. Furthermore, the laser irradiation unit 1 is provided at a position farther away from the workpiece surface 90S than the gas nozzle 22C (nozzle unit 2). The gas nozzle 22C has a pair of nozzle wall bodies 61 and 61 facing each other at an interval in a horizontal direction, and a transmission window portion 60 that covers the upper side of the nozzle wall bodies 61 and 61. Each nozzle wall body 61 has a nozzle hole 70 that guides high-pressure air guided from a compressor (not illustrated) to the workpiece surface 90S, as the jet stream A. The laser beam L emitted for irradiation from the laser irradiation unit 1 is transmitted through the transmission window portion 60, and is directed onto the workpiece surface 90S. That is, the transmission window portion 60 is formed of glass or resin through which the laser beam L can be transmitted.

According to the above-described configuration, the gas supplied from the nozzle unit 2 and the laser beam L emitted for irradiation from the laser irradiation unit 1 can be directed toward the workpiece 90 from the mutually same direction. As a result, the gas (jet stream A) can be accurately supplied toward the irradiation range Z of the laser beam L. In this manner, the plume generated inside the machining groove 91 can be more efficiently removed.

In addition, according to the above-described configuration, the laser beam L can be emitted for irradiation from a direction the same as that of the gas nozzle 22C through the transmission window portion 60 provided in the nozzle unit 2 (gas nozzle 22C). As a result, the gas (jet stream A) can be more accurately supplied toward the irradiation range Z of the laser beam L.

Hitherto, the third embodiment of the present invention has been described. The above-described configurations can be changed or modified in various ways as long as the change or the modification does not depart from the concept of the present invention.

INDUSTRIAL APPLICABILITY

According to the above-described laser machining device 100, formation of the heat-affected layer in the workpiece 90 can be further prevented.

REFERENCE SIGNS LIST

100: Laser machining device
1: Laser irradiation unit
2: Nozzle unit
11: Light source
12: Galvano scanner
21: Compressor
22, 22B, 22C: Gas nozzle
40: Resistor
41: First resistor
42: Second resistor
43: Third resistor
60: Transmission window portion
61: Nozzle wall body
70: Nozzle hole
90: Workpiece
90S: Workpiece surface
91: Machining groove
91B: Groove bottom surface
91W: Groove end surface
A, A1, A2, A3: Jet stream
L: Laser
t1, t2: End portion
V: Valve
V1: First valve
V2: Second valve
V3: Third valve

The invention claimed is:

1. A laser machining device comprising:
a laser irradiation unit that forms a machining groove of which a first end is open to an end portion of a workpiece formed of carbon fiber reinforced by plastic, and a second end and a groove bottom surface are closed, by performing laser machining on the workpiece while scanning a workpiece surface from the end portion of the workpiece; and a nozzle unit configured to eject a gas for removing a plume over an irradiation range of the workpiece surface on which the laser machining is performed by the laser irradiation unit, wherein the nozzle unit is disposed above the first end and inclined with respect to the workpiece surface, and is configured so a flow speed of the gas supplied to the irradiation range increases from the first end toward the second end of the machining groove, and the gas in contact with the groove bottom surface within the machining groove flows from the second end toward the first end.

2. The laser machining device according to claim 1, wherein the flow speed of the gas supplied to the irradiation range increases from a portion where a relative distance between the nozzle unit and the workpiece surface in the irradiation range is short toward a portion where the relative distance is long.

3. The laser machining device according to claim 1, wherein the nozzle unit is configured to eject the gas to an extending direction of the machining groove from a direction inclined to the first end of the machining groove, as viewed in a direction orthogonal to the machining groove in a plane on which the workpiece surface spreads.

4. The laser machining device according to claim 1, wherein the nozzle unit comprises a gas nozzle comprising a plurality of opening portions adjacent to each other from the first end to the second end, and an opening area of the plurality of opening portions is configured to gradually decrease from the first end toward the second end.

5. The laser machining device according to claim 1, wherein the nozzle unit comprises a plurality of resistors adjacent to each other from the first end to the second end, and generating resistance against a flow of the gas, and the plurality of resistors are configured so the resistance gradually decreases from the first end toward the second end.

6. The laser machining device according to claim 5, wherein the resistor comprises a porous plate in which a plurality of holes are formed, and is configured so an opening ratio of the porous plate gradually increases from the first end toward the second end.

7. The laser machining device according to claim 5, wherein the resistor comprises a valve whose opening degree is adjustable, and is configured so an opening degree of the valve increases from the first end toward the second end.

8. A laser machining device comprising:

a laser irradiation unit that forms a machining groove of which a first end is open to an end portion of a workpiece formed of carbon fiber reinforced plastic, and the second end and a groove bottom surface are closed, by performing laser machining on the workpiece while scanning a workpiece surface from the end portion of the workpiece; and a nozzle unit configured to eject a gas for removing a plume over an irradiation range of the workpiece surface on which the laser machining is performed by the laser irradiation unit, wherein the nozzle unit is disposed above the first end and inclined with respect to the workpiece surface, and is configured so a flow speed of the gas supplied to the irradiation range increases from the second end toward the first end of the machining groove, and the gas in contact with the groove bottom surface within the machining groove flows from the second end toward the first end.

* * * * *